US006169882B1

(12) United States Patent
Amma

(10) Patent No.: US 6,169,882 B1
(45) Date of Patent: *Jan. 2, 2001

(54) RADIO DISPLAY PAGER WITH CONTROLLER FOR PRIORITIZED MESSAGE MANAGEMENT

(75) Inventor: Sadayuki Amma, Kakegawa (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/994,026

(22) Filed: Dec. 18, 1997

(30) Foreign Application Priority Data

Dec. 19, 1996 (JP) .................................................. 8-340065

(51) Int. Cl.[7] ...................................................... H04B 1/00

(52) U.S. Cl. .................. 455/38.3; 455/38.1; 340/825.44

(58) Field of Search ........................ 340/825.47, 825.46, 340/38.1; 455/38.3, 343

(56) References Cited

U.S. PATENT DOCUMENTS 4,988,991 * 1/1991 Motegi ............................ 340/825.44
5,140,561 * 8/1992 Miyashita et al. .............. 340/825.44
5,225,826 * 7/1993 De Luca et al. ................ 340/825.44
5,384,565 * 1/1995 Cannon ........................... 340/825.44
5,418,528 * 5/1995 Hosak et al. .................... 340/825.44

FOREIGN PATENT DOCUMENTS 3-245621 11/1991 (JP) .
5-30018 2/1993 (JP) .
7-79464 3/1995 (JP) .
WO 95/06921 3/1995 (WO) .

* cited by examiner

*Primary Examiner*—Nguyen Vo
*Assistant Examiner*—Makoto Aoki
(74) *Attorney, Agent, or Firm*—Scully, Scott, Murphy & Presser

(57) ABSTRACT

A radio display pager receives an addressed paging signal containing a message which may be accompanied by a predetermined parameter such as telephone number. The pager stores the message into a memory as a normal message if it is not accompanied by the parameter or stores it as an important message if it is accompanied by the parameter. If the memory is full, the pager removes an oldest normal message from the memory if the memory contains at least one normal message, and removes an oldest important message from the memory if the memory contains only the important messages.

2 Claims, 2 Drawing Sheets

RADIO DISPLAY PAGER WITH CONTROLLER FOR PRIORITIZED MESSAGE MANAGEMENT

BACKGROUND OF THE INVENTION

1. Field of the Invention

The present invention relates generally to radio display pagers, and more specifically to the management of received messages stored in a radio display pager.

2. Description of the Related Art

Japanese Laid-Open Patent Specification Hei-3-245621 discloses a radio display pager having a message memory in which received messages are successively stored in a memory to allow the user to read them at user's convenient time. In order to prevent old messages from being automatically removed from the memory due to user's carelessness, the memory is constantly monitored and its remaining capacity is determined. When the remaining capacity becomes lower than a predetermined value, the user is alerted to divert his attention to the received messages.

However, if the pager is left unattended, the memory will be overloaded and old messages will be automatically removed from the memory regardless of their urgency.

SUMMARY OF THE INVENTION

It is therefore an object of the present invention to provide a radio display pager which protects important or urgent messages by removing a normal message from a memory prior to removal of important messages when the memory is fill.

According to the present invention, a radio pager receives an addressed paging signal containing a message which may be accompanied by a predetermined parameter and stores the message into a memory as a normal message if the message is not accompanied by the predetermined parameter or stores it as an important message if it is accompanied by the predetermined parameter. If the memory is full, the pager removes an oldest normal message from the memory if the memory contains at least one normal message, and removes an oldest important message from the memory if the memory contains only the important messages.

According to a specific aspect, the pager of the present invention identifies any one of the stored normal and important messages as a confirmed message when such a message is read by a user, or monitors time lapse of each of the stored normal and important messages which are unread by a user, and identifies one of the messages as a confirmed message when the time lapse of the one stored message exceeds a predetermined value. The pager removes an oldest confirmed message from the memory if the memory contains at least one confirmed message, removes an oldest of the normal messages which are unread by the user if the memory contains at least one unread normal message, and removes an older one of important messages from the memory if the memory contains only the important messages which are accompanied by same predetermined parameters. The pager further removes an oldest unread important message from the memory if the memory contains only the important messages which are not accompanied by the same predetermined parameters.

BRIEF DESCRIPTION OF THE DRAWINGS

The present invention will be described in further detail with reference to the accompanying drawings, in which.

DETAILED DESCRIPTION

Figure 1:
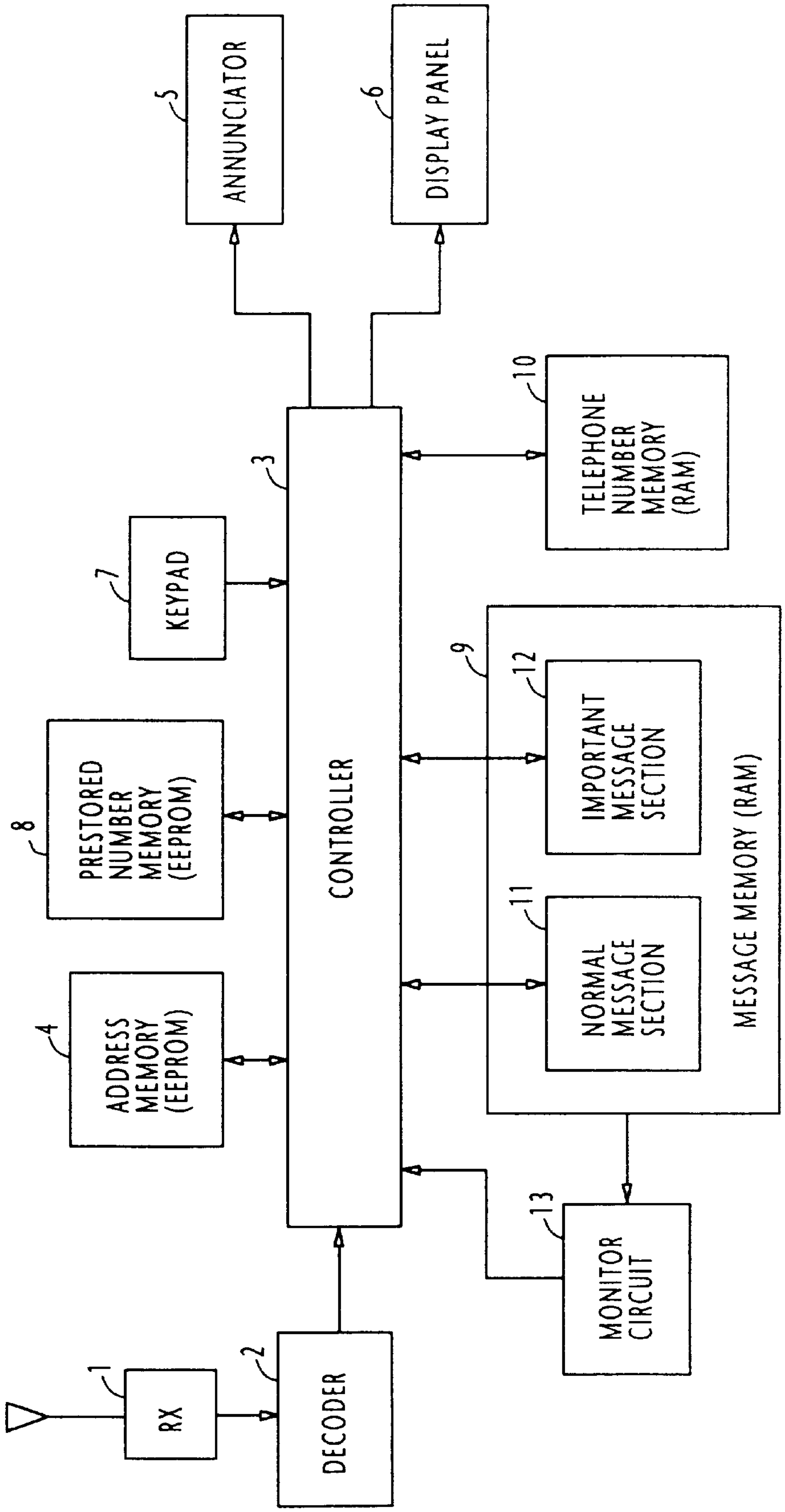
FIG. 1 is a block diagram of a radio display pager according to the present invention.

As shown in FIG. 1, the radio display pager of the present invention comprises a radio receiver 1 for receiving paging signals transmitted in a sequence of successive frames each containing a synchronization field, an address field for indicating a destination pager's identifier, and a data field containing a message or a message and a caller's telephone number (or caller's personal or organizational name) combined. The signals contained in the address and data fields are encoded at the transmit site into a special code that allows transmission errors to be corrected at the receive site. The decoder 2, connected to the output of the receiver 1, provides decoding of the coded signals and the original signals recovered by the decoder are fed to a controller 3, where the identifier contained in the address field is compared with the pager's identifier pre-stored in an address memory or EEPROM (electrically erasable programmable read only memory) 4. If they match, controller 3 activates an annunciator 5. The contents of the data field are stored and then displayed on a display panel 6 when the pager's user operates a key on a keypad 7.

According to the present invention, the pager includes a pre-stored number memory 8, implemented with an EEPROM, is provided for storing telephone numbers of important persons or organizations. In addition, the pager has a message memory 9 and a telephone number 10, both of which are implemented with a random access memory. The message memory 9 is divided into a normal message section 11 for storing messages not accompanied by a telephone number and an important message section 12 for storing important messages that are accompanied by a telephone number. These telephone numbers are stored in the telephone number memory 10. A monitor circuit 13 is further connected to the message memory 9 to monitor the time lapse of each of unread stored message and informs the controller 3 of a message when its time lapse exceeds a predetermined value. Controller 3 responds to the output of monitor circuit 13 by invoking an interrupt routine.

Figure 2:
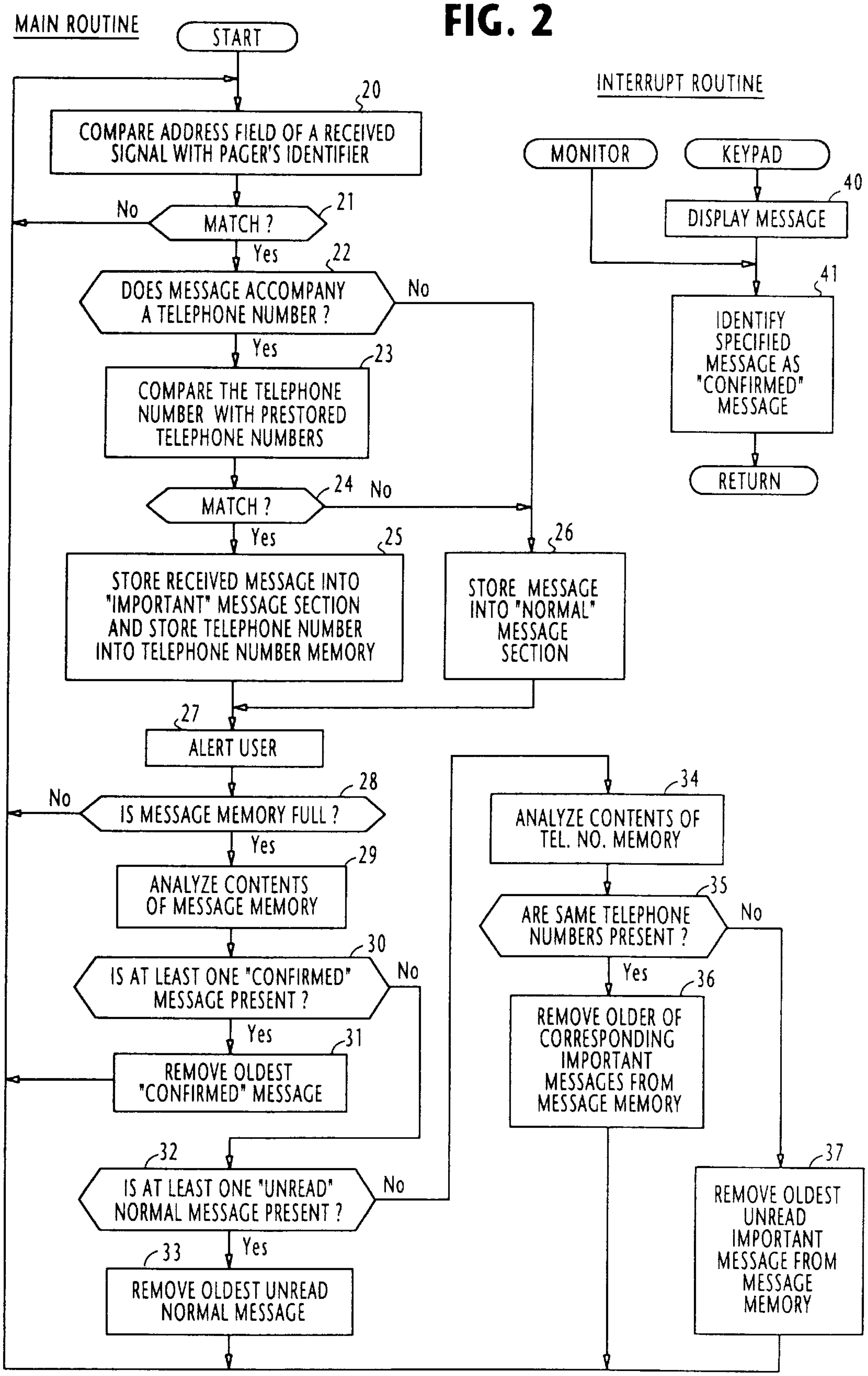
FIG. 2 is a flowchart of the operation of the controller of the radio display pager.

The operation of the controller 3 will be discussed hereinbelow with reference to the flowchart of FIG. 2. As illustrated, the controller normally executes a main routine by processing a decoded paging signal to store a received message. The controller operates an interrupt routine when the user operates the keypad to read the stored message at the time the user is alerted or at a later time convenient for the user or when the monitor circuit 13 produces an output.

The main routine begins with decision step 20 to compare the address field of a received paging signal with the pager's identifier. If they match (step 21), flow proceeds to decision step 22 determine whether a message contained in the data field of the received signal is accompanied by a telephone number. If so, flow proceeds from step 22 to step 23 to compare the telephone number with the telephone numbers stored in the pre-stored number memory 8. If the telephone number matches one of the pre-stored telephone numbers (step 24), it is determined that the message in the data field is an important message, and flow proceeds to step 25 to store the message into the important message section 12 of message memory 9 and the telephone number into the telephone number memory 10. If the message is not accompanied by a telephone number (step 22), or if the telephone number does not match a pre-stored one (step 24), flow proceeds to step 26 to store the message into the normal message section 11 of message memory 9.

Therefore, only those messages that are accompanied by one of a group of predetermined telephone numbers are stored as important messages. Those messages which are not accompanied by a telephone number or accompanied by a telephone number not belonging to the group of predetermined ones are stored as normal messages.

Following the execution of step 25 or 26, the annunciator 5 is activated (step 27) to alert the user. Controller 3 proceeds to decision step 28 to check to see if the message memory 9 is full. If not, flow returns to the starting point of the main routine to repeat the above process to ready for the reception of subsequent messages.

Meanwhile, the user may operate the keypad 7 to read a stored message. This invokes the interrupt routine by displaying the stored message (step 40). At step 41, controller 3 changes the identification of the displayed message to a "confirmed" message, regardless of whether it is stored as a normal or an important message. If the displayed message is an important message, it is relocated from the important message section 12 to the normal message section 11 and marked "confirmed". If the displayed message is a normal message, it is only marked "confirmed". Controller 3 then returns to the main routine.

When the time lapse of an unread normal or important message execeeds a predetermined time-out period, an interrupt routine is invoked by monitor circuit 13. In response, controller 3 proceeds to step 41 to change the identification of the specified message to a "confirmed" message.

If the message memory 9 is full (step 28), flow proceeds to step 29 to analyze the contents of message memory 9. At step 30, the controller determines whether the message memory 9 contains at least one "confirmed" message. If this is the case, the controller proceeds from step 30 to step 31 to remove the oldest "confirmed message and returns to the starting point of the main routine. If the decision at step 30 is negative, flow proceeds to step 32 to check to see if there is at least one "unread" normal message in the message memory. If so, flow proceeds from step 32 to step 33 to remove the oldest "unread" normal message and returns to step 20.

If the decision at step 32 is negative, the fill message memory 9 indicates that it contains only important messages, and flow proceeds to step 34 to analyze the contents of the telephone number memory 10. At step 35, the controller determines whether mutually identical telephone numbers are present. If the decision is affirmative at step 35, flow proceeds to step 36 to remove, from the message memory, the older one of important messages that correspond to the mutually identical telephone numbers, and returns to step 20. If the decision at step 35 is negative, the oldest unread important message is removed from the message memory (step 37), and flow returns to step 20.

What is claimed is:

1. A radio pager for receiving a paging signal addressed to the pager, the paging signal containing a message which may be accompanied by a source identifier identifying a source from which the paging signal has originated, comprising:

a first memory for storing a plurality of source identifiers;

a second memory; and control circuitry for determining whether the message is accompanied by one of said source identifiers stored in the first memory, storing said message into the second memory as one of: 1) a normal message if the message is not accompanied by the stored source identifier and 2) an important message if the message is accompanied by the stored source identifier, and labeling the stored messages as one of: 1) read messages and 2) unread messages depending on whether the messages stored in the second memory are one of read and unread by a user, monitoring time lapse of each of the unread messages, and relabeling one of the unread messages as a read message when the time lapse of said one unread message exceeds a predetermined value, said control circuitry being configured to remove, from said second memory if the second memory is full, a) an oldest read message if the second memory contains at least one read message, b) an oldest unread normal message if the second memory contains at least one unread normal message, c) an oldest one of important messages accompanied by mutually different source identifiers if the second memory contains only important messages, and d) an older one of important messages all accompanied by a plurality of same source identifiers if the second memory contains only important messages.

2. A message management method for a radio pager for receiving a paging signal addressed to the pager, the paging signal containing a message which may be accompanied by a source identifier identifying a source from which the paging signal has originated, the method comprising the steps of:

a) storing a plurality of source identifiers in a first memory;

b) determining whether the message is a accompanied by one of said source identifiers stored in the first memory and storing said message into a second memory as one of: 1) a normal message if the message is not accompanied by the stored source identifier and 2) an important message if the message is accompanied by the stored source identifier;

c) labeling the stored messages as one of: 1) read messages and 2) unread messages depending on whether the messages stored in the second memory are one of read and unread by a user, monitoring time lapse of each of the unread messages, and relabeling one of the unread messages as a read message when the time lapse of said one unread message exceeds a predetermined value;

d) removing an oldest read message from the second memory if the second memory is full and contains at least one read message;

e) removing an oldest unread normal message if the second memory is full and contains at least one unread normal message;

f) removing an oldest one of important messages accompanied by mutually different source identifiers if the second memory is full and contains only important messages; and g) removing an older one of important messages respectively accompanied by a plurality of same source identifiers if the second memory is full and contains only important messages.

* * * * *